US012051523B2

(12) United States Patent
Fujii et al.

(10) Patent No.: US 12,051,523 B2
(45) Date of Patent: Jul. 30, 2024

(54) SILVER POWDER, PRODUCTION METHOD THEREOF, AND CONDUCTIVE PASTE

(71) Applicant: DOWA ELECTRONICS MATERIALS CO., LTD., Tokyo (JP)

(72) Inventors: Masanori Fujii, Tokyo (JP); Yuma Higashi, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 18/450,736

(22) Filed: Aug. 16, 2023

(65) Prior Publication Data

US 2023/0395280 A1 Dec. 7, 2023

Related U.S. Application Data

(62) Division of application No. 17/278,796, filed as application No. PCT/JP2019/037843 on Sep. 26, 2019, now Pat. No. 11,804,313.

(30) Foreign Application Priority Data

Sep. 28, 2018 (JP) ................................ 2018-185391

(51) Int. Cl.
*B22F 9/24* (2006.01)
*B22F 1/00* (2022.01)
(Continued)

(52) U.S. Cl.
CPC ................ *H01B 1/22* (2013.01); *B22F 1/00* (2013.01); *B22F 1/05* (2022.01); *B22F 1/07* (2022.01);
(Continued)

(58) Field of Classification Search
CPC . B22F 9/24; B22F 2009/245; B22F 2301/255
See application file for complete search history.

(56) References Cited

U.S. PATENT DOCUMENTS

2015/0034883 A1 2/2015 Hirata et al.

FOREIGN PATENT DOCUMENTS

JP 04333504 A 11/1992
JP 2015155576 A 8/2015
(Continued)

OTHER PUBLICATIONS

English translation of Kunimine et al., JPH04333504A, obtained from EPO espacenet May 4, 2024. (Year: 2024).*
(Continued)

*Primary Examiner* — Adam Krupicka
(74) *Attorney, Agent, or Firm* — Carmody Torrance Sandak & Hennessey LLP

(57) ABSTRACT

Provided is silver powder including silver particles having closed pores inside the particles, wherein when cross sections of the silver particles are observed at a magnification of 10,000, an average of numbers of the pores having Heywood diameters of 200 nm or greater relative to an area of the cross sections is 0.01 pores/$\mu m^2$ or less, and wherein when the cross sections of the silver particles are observed at a magnification of 40,000, an average of numbers of the pores having Heywood diameters of 10 nm or greater but less than 30 nm relative to the area of the cross sections is 25 pores/$\mu m^2$ or more.

3 Claims, 4 Drawing Sheets

(51) Int. Cl.
*B22F 1/05* (2022.01)
*B22F 1/07* (2022.01)
*B22F 1/107* (2022.01)
*H01B 1/22* (2006.01)

(52) U.S. Cl.
CPC ................ *B22F 1/107* (2022.01); *B22F 9/24* (2013.01); *B22F 2301/255* (2013.01)

(56) References Cited

FOREIGN PATENT DOCUMENTS

| | | |
|---|---|---|
| JP | 2015232180 A | 12/2015 |
| KR | 10-2014-0125418 | 10/2014 |

OTHER PUBLICATIONS

International Search Report dated Dec. 24, 2019 issued in International Patent Application No. PCT/JP2019/037843.
Written Opinion of the International Search Authority dated Dec. 24, 2019 issued in International Patent Application No. PCT/JP2019/037843.
Japanese Office Action dated Dec. 10, 2019 issued in corresponding Japanese Patent Application No. 2018-185391.
Japanese Office Action dated Aug. 20, 2020 issued in corresponding Japanese Patent Application No. 2018-185391.
Korean Office Action dated Dec. 29, 2022 issued in corresponding Korean patent application No. 10-2021-7012300.

* cited by examiner

SILVER POWDER, PRODUCTION METHOD THEREOF, AND CONDUCTIVE PASTE

TECHNICAL FIELD

The present invention relates to silver powder, a method for producing the silver powder, and a conductive paste. In particular, the present invention relates to: silver powder used in a conductive paste used for forming circuits such as internal electrodes of multilayer capacitors, solar cells, plasma display panels, and touch panels; a method for producing the silver powder; and a conductive paste.

BACKGROUND ART

In one widely used method for forming internal electrodes of a multilayer capacitor, conductor patterns of a circuit board, and electrodes and circuits of a substrate for a solar cell or a plasma display panel, silver powder is added to an organic solvent together with glass frit and kneaded to produce a firing-type conductive paste, the conductive paste is formed into a predetermined pattern on a substrate, the conductive paste is heated at a temperature of 500° C. or higher to remove the organic solvent, and particles of the silver powder are sintered together to form a conductive film.

Conductive pastes used for such applications are demanded to respond to, for example, higher density of conductive patterns and finer lines for downsizing electronic parts. In view thereof, silver powder used is demanded to have appropriately small particle diameters and a uniform particle size distribution, and to be dispersed in an organic solvent.

As such silver powder for conductive pastes, silver powder having closed pores inside the particles thereof is known (see, for example, PTL 1).

The closed pores inside the particles enable firing even at low temperatures (e.g., 400° C.).

CITATION LIST

Patent Literature

PTL 1: Japanese Patent Application Laid-Open (JP-A) No. 2015-232180

SUMMARY OF INVENTION

Technical Problem

As described above, in response to downsizing of electronic parts, silver powder and a conductive paste have been demanded that can draw fine wirings and form electrode wirings having low resistance after firing. When silver particles have closed pores inside thereof, substances present inside those pores (e.g., moisture and organic matters incorporated during reduction) are released from the silver particles to the outside during filing. However, it is expected that large pores result in great influences when the substances inside them are released.

The present invention aims to solve the problems existing in the art and achieve the following object. Specifically, the present invention has an object to provide silver powder that can draw fine wirings and form electrode wirings having lower resistance after firing than in the existing cases.

Solution to Problem

The present inventors conducted intensive studies to achieve the above object and have found that the size of pores enclosed inside particles of silver powder influences a resistance value of electrode wirings after firing. On the basis of this finding, the present invention has been completed. Specifically, it has been found that when the size of pores enclosed inside particles is large like in the existing silver powder, the resistance of electrode wirings becomes higher due to large spaces remaining even after firing, whereas when the size of pores enclosed inside particles is small and a large number of small pores are dispersed in spherical silver powder, the thermal weight loss temperature decreases to make it possible to form electrode wirings having low resistance after firing. A small pore contacts silver in a larger area than a large pore does, and the temperature in the small pore easily increases at the time of firing. When a large number of small pores are dispersed, it is expected that an organic solvent, which inhibits conduction, enclosed in the pores are heated and burnt at lower temperatures than in the case where large pores are present. The present inventors have found that it is effective to control the liquid temperature during the course of reduction in order to control the size of pores enclosed inside particles.

The present invention is based on the above finding obtained by the present inventors, and means for achieving the object are as follows.

<1> Silver powder including silver particles having closed pores inside the particles, wherein when cross sections of the silver particles are observed at a magnification of 10,000, an average of numbers of the pores having Heywood diameters of 200 nm or greater relative to an area of the cross sections is 0.01 pores/$\mu m^2$ or less, and wherein when the cross sections of the silver particles are observed at a magnification of 40,000, an average of numbers of the pores having Heywood diameters of 10 nm or greater but less than 30 nm relative to the area of the cross sections is 25 pores/$\mu m^2$ or more.

<2> The silver powder according to <1>, wherein a porosity (%) is from 1% to 4%, where the porosity is expressed as an area of the pores relative to the area of the cross sections when the cross sections of the silver particles are observed at a magnification of 40,000.

<3> The silver powder according to <1> or <2>, wherein an average of the Heywood diameters of the silver particles when the cross sections of the silver particles are observed at a magnification of 40,000 is from 0.5 μm to 1 μm.

<4> The silver powder according to any one of <1> to <3>, wherein a temperature at which a weight change of the silver powder is a weight loss of 90% of a maximum weight loss is 270° C. or lower when the silver powder is heated from room temperature to 400° C. at a heating rate of 10° C./min through thermogravimetry-differential thermal analysis.

<5> A method for producing silver powder including silver particles having closed pores inside the particles, the method including adding a reducing agent-containing solution containing aldehyde as a reducing agent to an aqueous reaction system containing silver ions and mixing the aqueous reaction system, wherein a liquid temperature of the aqueous reaction system is maintained to be 33° C. or lower until 90 seconds from start of the mixing.

<6> The method producing silver powder according to <5>, wherein the liquid temperature of the aqueous reaction system is maintained to be 30° C. or lower until 90 seconds from the start of the mixing.

<7> The method producing silver powder according to <5> or <6>, wherein the liquid temperature of the aqueous reaction system before addition of the reducing agent is from 10° C. to 20° C., and an amount of the reducing agent added is from 6.0 equivalents to 14.5 equivalents relative to an amount of silver.

<8> A conductive paste including the silver powder according to any one of <1> to <4>.

Advantageous Effects of Invention

The present invention can solve the problems existing in the art and achieve the following object. Specifically, the present invention can provide silver powder that can draw fine wirings and form electrode wirings having lower resistance after firing than in the existing cases.

DESCRIPTION OF EMBODIMENTS (Silver Powder)

Figure 1:
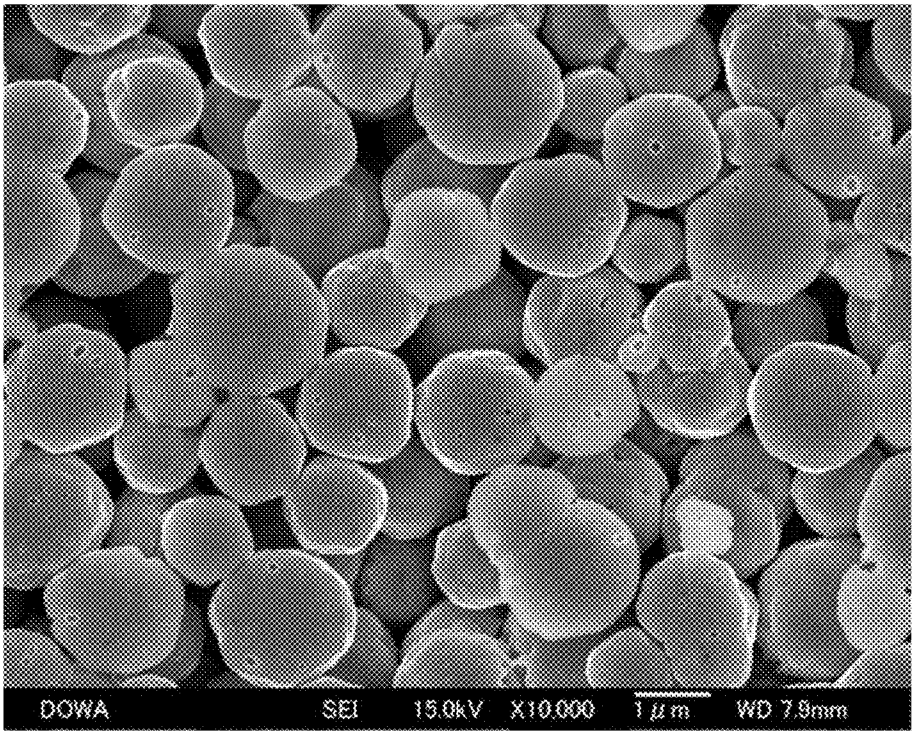
FIG. 1 is a cross-sectional SEM image of silver powder of Example 1 observed at a magnification of 10,000.

Silver powder of the present invention is silver powder including silver particles having closed pores inside the particles, wherein when cross sections of the silver particles are observed at a magnification of 10,000, an average of numbers of the pores having Heywood diameters of 200 nm or greater relative to an area of the cross sections is 0.01 pores/μm$^2$ or less, and wherein when the cross sections of the silver particles are observed at a magnification of 40,000, an average of numbers of the pores having Heywood diameters of 10 nm or greater but less than 30 nm relative to the area of the cross sections is 25 pores/μm$^2$ or more.

The amount of the silver particles relative to the silver powder is preferably 90% by mass or more, more preferably 95% by mass or more, further preferably substantially 100% (i.e., the silver powder consists of silver particles).

<Silver Particles>

The silver particles have closed pores inside the particles.

The shape of the silver particles is not particularly limited and may be appropriately selected depending on the intended purpose.

The average of the Heywood diameters of the silver particles when the cross sections of the silver particles are observed at a magnification of 40,000 is preferably 0.3 μm or greater, more preferably 0.4 μm or greater, further preferably μm or greater. Also, it is preferably 2 μm or less, more preferably 1.5 μm or less, and from the viewpoint of the ability to suitably draw fine wirings when forming electrode wirings, it is further preferably 1 μm or less. When the average of the Heywood diameters when the cross sections of the silver particles are observed at a magnification of 40,000 is less than 0.3 μm, it is difficult to have the same degree or more of pores in terms of the Heywood diameter inside the particles, which may make it impossible to confirm whether there are a small number of large pores as the whole powder. When it is more than 2 μm, it may be impossible to include the entirety of one particle in one field of view through observation at a magnification of 40,000.

The average of aspect ratios (longer sides/shorter sides) of the silver particles is preferably 2 or less. This is because when the average of the aspect ratios thereof is more than 2, a paste formed therefrom has degraded permeability through a mesh, and non-uniform discharge in printing of thin lines is highly likely to occur.

Closed Pores

The "closed pores" or "pores" present inside the particles of the silver particles refer to pores enclosed inside the particles without having any part connecting to the outside of the particles from the periphery of the particles when cross sections of the silver particles are observed for pores inside the particles.

When the cross sections of the silver particles are observed at a magnification of 10,000, the average of the numbers of the pores having Heywood diameters of 200 nm or greater relative to the area of the cross sections is 0.01 pores/μm$^2$ or less and preferably 0.00 pores/μm$^2$ or less (i.e., such pores are not observed).

The number of the silver particles observed at a magnification of 10,000 is preferably 100 particles or more that are randomly selected. The area of the cross sections of the silver particles observed at a magnification of 10,000 is preferably 60 μm$^2$ or larger per one field of view. The total area of the cross sections of the silver particles observed is preferably 120 μm$^2$ or larger.

Two or more fields of view are observed. In each of the fields of view, the number of the pores having Heywood diameters of 200 nm or greater relative to the area of the cross sections is counted. The counted numbers are averaged. The upper limit of the fields of view observed is 5 fields of view.

Even when parts of the particles are not included in the frame of a field of view of a SEM image, those particles are used for calculation of the number of the particles and the area. Pores having parts that are not included in the frame of a field of view of a SEM image are not used as the above-described pores because the Heywood diameters thereof are unmeasurable.

When the cross sections of the silver particles are observed at a magnification of 40,000, the average of the numbers of the pores having Heywood diameters of 10 nm or greater but less than 30 nm relative to the area of the cross sections is 25 pores/μm$^2$ or more, preferably 28 pores/μm$^2$ or more.

The reason why they are observed at a magnification of 40,000 is because of being able to sufficiently observe the pores of 10 nm or greater but less than 30 nm, which are difficult to observe at a magnification of 10,000. The image of the cross sections of the particles photographed at a magnification of 40,000 may be, if necessary, enlarged for observation. The pores of less than 10 nm are not included in the above number because such pores may be or may not be observed as pores depending on the state of a SEM image and are difficult to identify.

The area of the cross sections of the silver particles observed at a magnification of 40,000 is preferably 3 $\mu m^2$ or larger per one field of view. The total area of the cross sections of the silver particles observed is preferably 15 $\mu m^2$ or larger, more preferably 20 $\mu m^2$ or larger. For example, the total area when 5 fields of view are observed is preferably 15 $\mu m^2$ or larger, more preferably 20 $\mu m^2$ or larger. Note that, the upper limit of the total area of the cross sections of the silver particles observed is 50 $\mu m^2$.

A plurality of fields of view (preferably 5 or more fields of view) are observed. In each of the fields of view, the number of the pores having Heywood diameters of 10 nm or greater but less than 30 nm relative to the area of the cross sections is counted. The counted numbers are averaged.

Even when parts of the particles are not included in the frame of a field of view of a SEM image, those particles are used for calculation of the number of the particles and the area. Pores having parts that are not included in the frame of a field of view of a SEM image are not used as the above-described pores because the Heywood diameters thereof are unmeasurable.

The cross sections of the silver particles and the pores inside the particles can be observed in the following manner. Specifically, the silver particles in a dense state are buried in a resin and solidified. After that, the solidified product is polished with, for example, a cross section polisher to expose the cross sections of the silver particles. The cross sections of the particles are observed with, for example, a field-emission scanning electron microscope (FE-SEM).

In the silver powder including the silver particles having closed pores inside the particles, when the cross sections of the silver particles are observed in the above manner, at least one closed pore is preferably observed inside half or more of the silver particles observed for the cross sections.

[Measurement Methods of Cross-Sectional Area of Silver Particles, Heywood Diameters of Cross Sections of Silver Particles, Area of Pores, and Heywood Diameters of Pores]

Image analysis software (e.g., image analysis-type particle size distribution analysis software Mac-View, available from MOUNTECH Co., Ltd.) is used to trace the periphery of the cross sections of the silver particles photographed by FE-SEM with a pointer on a screen displaying an image. The area of the cross sections of the particles in the range enclosed by tracing with a single stroke can be calculated, and the Heywood diameters of the cross sections of the silver particles can also be calculated. Similarly, by tracing the periphery of the pores observed in the cross sections of the silver particles (the closed pores without having any shared parts with the periphery of the silver particles) with a pointer on a screen displaying an image, the area of the pores in the range enclosed by tracing with a single stroke can be calculated, and the Heywood diameters of the pores can also be calculated. In the image analysis software, it is preferable to trace an image on a screen after the image is enlarged to such a size as to easily control the pointer in conformity to the size of an object to be traced.

[Porosity]

The porosity (%) is expressed as an area of the pores relative to the area of the cross sections when the cross sections of the silver particles are observed at a magnification of 40,000. A plurality of fields of view (preferably 5 or more fields of view) are observed. In each of the fields of view, the porosity is calculated. The calculated porosities are averaged.

The porosity is preferably from 1% to 4%, more preferably from 2% to 3%.

[Weight Loss End Temperature]

The weight loss end temperature refers to a temperature at which a weight change of the silver powder is a weight loss of 90% of the maximum weight loss when the silver powder is heated from room temperature to 400° C. at a heating rate of 10° C./min through thermogravimetry-differential thermal analysis.

Specifically, it can be determined as a temperature at which the weight is lost by 90% relative to the maximum weight loss (the maximum lost weight) from room temperature to 400° C. when the weight change is measured using a thermogravimetry-differential thermal analyzer (e.g., TG8120, available from Rigaku Corporation) based on thermogravimetry-differential thermal analysis (TG-DTA) from room temperature to 400° C. at a heating rate of 10° C./min under the atmosphere.

The weight loss end temperature is preferably 300° C. or lower, more preferably 270° C. or lower.

(Method for Producing Silver Powder)

A method of the present invention for producing silver powder is a method for producing the silver powder including silver particles having closed pores inside the particles. The above method includes a mixing step and if necessary further includes other steps such as a washing step and a drying step.

<Mixing Step>

The mixing step is a step of adding a reducing agent-containing solution containing aldehyde as a reducing agent to an aqueous reaction system containing silver ions and mixing the aqueous reaction system. In the mixing step, the liquid temperature of the aqueous reaction system is maintained to be 33° C. or lower until seconds from the start of the mixing.

In the mixing step, the silver particles precipitate through reduction of the silver ions.

The liquid temperature of the aqueous reaction system until 90 seconds from the start of the mixing increases as the reaction proceeds by the start of the mixing. The highest reached temperature thereof is maintained to be 33° C. or lower, preferably 30° C. or lower.

When the highest reached temperature thereof is higher than 33° C., the silver particles grow fast, which is why fine pores do not easily form to potentially result in easier formation of large pores. The formed large particles incorporate a large amount of organic components in the aqueous reaction system. This may cause adverse effects due to unevenness in a distribution of the organic components in the silver particles.

In order to achieve the above highest reached temperature, it is preferable to lower the liquid temperature of the aqueous reaction system before the addition of the reducing agent. Further, it is more preferable to provide a mechanism configured to lower the liquid temperature by cooling from the outside to dissipation heat of reaction. In addition to the cooling, it is also effective to suppress increase in the liquid temperature due to the heat of reaction by, for example, lowering the amount of the reducing agent to be contained, lowering the amount of silver to be contained, increasing the volume of the aqueous reaction system after the addition of the reducing agent, and lowering the temperature of the reducing agent-containing solution to be added. Examples of the mechanism configured to lower the liquid temperature include various mechanisms such as a mechanism provided with a heat exchanger such as a cooling jacket, a mechanism in which the outer wall to be in contact with the solution is formed of a material that easily dissipates heat, a mechanism provided with a heat dissipation fin for air cooling, and a mechanism provided with a stirring blade having a cooling function.

For measuring and controlling the liquid temperature of the aqueous reaction system until 90 seconds from the start of the mixing (the highest reached temperature), the time taken from the start of the addition of the reducing agent until the completion of the addition of the reducing agent (reducing agent addition time) is preferably within 10 seconds.

In the mixing step, cavitation may be allowed to occur at the same time as the addition of the reducing agent-containing solution or at the time of the mixing. A method of allowing cavitation to occur may be the method described in JP-A No. 2015-232180.

Aqueous Reaction System

The aqueous reaction system containing the silver ions may be an aqueous solution or slurry containing silver nitrate, a silver complex, or a silver intermediate. The aqueous solution containing a silver complex can be produced by adding aqueous ammonia or an ammonium salt to an aqueous silver nitrate solution or a silver oxide suspension. Among them, an aqueous silver ammine complex solution obtained by adding aqueous ammonia to an aqueous silver nitrate solution is preferable because the silver particles have appropriate particle diameters and spherical shapes.

The concentration of the silver in the aqueous reaction system is preferably by mass or lower, more preferably from 0.3 to 0.6% by mass. When the above concentration is higher than 0.8% by mass, the amount of heat generated after the addition of the reducing agent becomes large, which may make it difficult to control the liquid temperature of the aqueous reaction system until 90 seconds from the start of the mixing (the highest reached temperature) to be 33° C. or lower.

The amount of ammonia to be added for preparing the aqueous solution containing the silver complex is preferably from 1.2 equivalents to 3.2 equivalents (mole equivalents), more preferably from 2.0 equivalents to 3.2 equivalents, relative to the amount of the silver. When the amount thereof is more than 3.2 equivalents, the amount of heat generated after the addition of the reducing agent becomes large, which may make it difficult to control the liquid temperature of the aqueous reaction system until 90 seconds from the start of the mixing (the highest reached temperature).

The liquid temperature of the aqueous reaction system before the addition of the reducing agent is preferably from 10° C. to room temperature (25° C.), more preferably from 10° C. to 20° C.

When the above temperature is lower than 10° C., silver nitrate may disadvantageously precipitate before the addition of the reducing agent. When it is higher than 25° C., even if controls are performed such as lowering the amount of the reducing agent to be contained, lowering the amount of silver to be contained, and increasing the volume of the aqueous reaction system after the addition of the reducing agent, it may be difficult to control the liquid temperature of the aqueous reaction system until 90 seconds from the start of the mixing (the highest reached temperature) to be 33° C. or lower without considerably changing properties of the particles such as the particle diameters of the silver particles.

Not only by adjusting the liquid temperature of the aqueous reaction system before the addition of the reducing agent to be from 10° C. to 20° C. but also by adjusting the amount of the reducing agent to be added to be from 6.0 equivalents to 14.5 equivalents relative to the amount of the silver as described below, it is possible to control the above highest reached temperature due to the heat of reaction to be 33° C. or lower, which is preferable.

Reducing Agent-Containing Solution

The reducing agent-containing solution contains aldehyde as a reducing agent.

The aldehyde is not particularly limited and may be appropriately selected depending on the intended purpose as long as it is a compound that contains an aldehyde group in the molecule thereof and functions as a reducing agent. The aldehyde is preferably formaldehyde or acetaldehyde.

The reducing agent-containing solution is preferably an aqueous solution or an alcohol solution. For example, formalin can be used as an aqueous solution containing formaldehyde.

The amount of the aldehyde contained in the reducing agent-containing solution is preferably from 15.0% by mass to 40.0% by mass, more preferably from by mass to 40.0% by mass.

The amount of the reducing agent to be added is preferably from 6.0 equivalents to 14.5 equivalents (mole equivalents), more preferably from 6.0 equivalents to 10.0 equivalents, relative to the amount of the silver. When the amount thereof is less than 6.0 equivalents, non-reduction comes to easily occur. When it is more than 14.5 equivalents, the amount of heat generated after the addition of the reducing agent becomes large, which may make it difficult to control the liquid temperature of the aqueous reaction system until 90 seconds from the start of the mixing (the highest reached temperature) to be 33° C. or lower. Meanwhile, when the amount of the reducing agent to be added is from 6.0 equivalents to 10.0 equivalents, a large number of pores having small sizes (i.e., having Heywood diameters of 10 nm or greater but less than 30 nm) easily form, which is advantageous.

The reducing agent-containing solution containing the aldehyde easily causes the liquid temperature to considerably increase from immediately after the mixing of the reducing agent as compared with other reducing agents such as ascorbic acid, because of the intense reaction immediately after the addition. Therefore, in the case of using the reducing agent-containing solution containing the aldehyde, it was difficult to maintain the liquid temperature of the aqueous reaction system until 90 seconds from the start of the mixing (the highest reached temperature) to be 33° C. or lower. However, it has been found that when the highest reached temperature is maintained to be 33° C. or lower in the method of the present invention for producing silver powder, it is possible to obtain the silver powder of the present invention having pores having desired properties.

In the case of using hydrazine as a reducing agent, almost no pores form.

<Other Steps>

Examples of the other steps include a washing step and a drying step.

(Conductive Paste)

A conductive paste of the present invention contains the silver powder of the present invention, preferably contains a solvent and a binder, and if necessary contains other components.

The amounts of the components are preferably adjusted so that the viscosity of the conductive paste becomes 100 Pa·s or more but 1,000 Pa·s or less as a 1 rpm value at 25° C. as measured using a corn plate viscometer. When the viscosity of the conductive paste is less than 100 Pa·s, "bleeding" may occur in the low viscosity region. When the viscosity of the conductive paste is more than 1,000 Pa·s, printing failures such as "blurring" may occur in the high viscosity region.

<Binder>

The binder is not particularly limited and may be a known resin as long as it has a thermally decomposing property and has been used as a resin composition to be fired in the vicinity of 800° C. as an application of an electrode of a solar cell. Examples thereof include organic binders such as cellulose derivatives such as methyl cellulose, ethyl cellulose, and carboxymethyl cellulose, polyvinyl alcohols, polyvinyl pyrrolidones, acrylic resins, alkyd resins, polypropylene resins, polyvinyl chloride-based resins, polyurethane-based resins, rosin-based resins, terpene-based resins, phenol-based resins, aliphatic petroleum resins, vinyl acetate-based resins, vinyl acetate-acrylic acid ester copolymers, and butyral resin derivatives such as polyvinyl butyral. These may be used alone or in combination.

<Solvent>

The solvent is not particularly limited and may be a known solvent so long as it can dissolve the binder. The organic binder is preferably dissolved and mixed therein before use in the production of the conductive paste.

Examples of the solvent include dioxane, hexane, toluene, ethyl cellosolve, cyclohexanone, butyl cellosolve, butyl cellosolve acetate, butyl carbitol, butyl carbitol acetate, diethylene glycol diethyl ether, diacetone alcohol, terpineol, methyl ethyl ketone, benzyl alcohol, and 2,2,4-trimethyl-1,3-pentanediol monoisobutyrate. These may be used alone or in combination.

<Other Components>

Examples of the other components include a surfactant, a dispersant, and a viscosity adjuster.

EXAMPLES

The present invention will be described below in more detail by way of Examples. However, the present invention should not be construed as being limited to the Examples below.

Example 1

In a beaker (made of glass) provided with a cooling jacket able to flow cooling water in a coil form around the beaker, 3,667 g of an aqueous silver nitrate solution having a silver concentration of 0.44% by mass (which had been cooled to 18.5° C. in a refrigerator) was provided. 151.8 g of aqueous ammonia having a concentration of 28% by mass (corresponding to 2.6 mole equivalents relative to the silver) was added to the aqueous silver nitrate solution. 30 seconds after addition of the aqueous ammonia, 7.2 g of an aqueous sodium hydroxide solution having a concentration of 20% by mass was added to obtain an aqueous silver ammine complex solution.

The temperature of the cooling water was set to 20° C. A thermocouple was provided at a position half the liquid depth to measure the liquid temperature. The liquid temperature of the aqueous silver ammine complex solution was found to be 20° C.

The aqueous silver ammine complex solution was stirred, 386.4 g of a 23% by mass formaldehyde solution (corresponding to 12.4 mole equivalents relative to the silver), which had been prepared by diluting formalin with pure water, was mixed with the aqueous silver ammine complex solution under stirring, while the cooling water was continued to flow.

The highest reached temperature 90 seconds from the start of the mixing was found to be 30° C.

90 seconds from the start of the mixing, 6.01 g of a 1.55% by mass stearic acid ethanol solution was added to terminate the reduction reaction, to obtain a slurry containing silver particles.

The slurry was filtrated, and washed with water until the conductivity of the filtrate would be 0.2 mS, followed by drying at 73° C. for 10 hours using a vacuum dryer. After that, the obtained dry powder was charged into a crusher (model SK-M10, obtained from Kyoritsu Riko, Co.) and was crushed for 30 seconds twice. In the above-described manner, silver powder of Example 1 was obtained.

The obtained silver powder of Example 1 was buried in a resin and then polished with a cross section polisher to expose the cross sections of the silver particles. Using a field-emission scanning electron microscope (FE-SEM; JEM-9310FIB, obtained from JEOL Ltd.), 2 fields of view of the cross sections of the particles were photographed at a magnification of 10,000. One field of view of the photographed images is depicted in FIG. 1.

Regarding the photographed FE-SEM images, image analysis-type particle size distribution analysis software (Mac-View, obtained from MOUNTECH Co., Ltd.) was used to trace, with a pointer on a screen displaying an image, the periphery of the pores observed inside the obtained silver particles (closed pores without having any part connecting to the periphery of the silver particles) in the cross sections of the silver particles. Thus, the Heywood diameters of the pores were calculated.

FIG. 1 depicts a FE-SEM image of the silver powder of Example 1 observed at a magnification of 10,000. As a result of using the image of the cross sections of the particles observed at a magnification of 10,000 (the total area of the cross sections of the particles: 62 $\mu m^2$) while enlarging the image if necessary for observation, the pores having Heywood diameters of 200 nm or greater were not observed. Although one more field of view was observed in addition to FIG. 1, the pores having Heywood diameters of 200 nm or greater were not observed.

Figure 2:
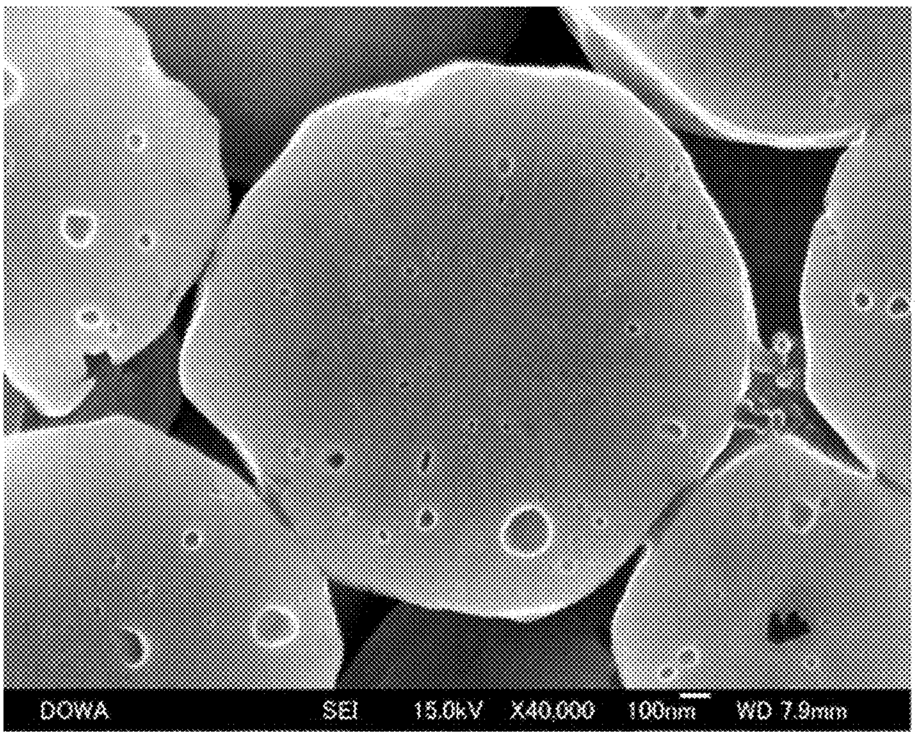
FIG. 2 is a cross-sectional SEM image of silver powder of Example 1 observed at a magnification of 40,000.

Next, 5 fields of view of the cross sections of the particles were photographed at a magnification of 40,000. FIG. 2 depicts one field of view of the photographed images. Regarding the photographed FE-SEM images, image analysis-type particle size distribution analysis software (Mac-View, obtained from MOUNTECH Co., Ltd.) was used to trace, with a pointer on a screen displaying an image, the periphery of particles in the cross sections of the obtained silver particles and the periphery of the pores observed inside the silver particles (closed pores without having any portion connecting to the periphery of the silver particles) in the cross sections of the silver particles, while enlarging the image if necessary. Thus, the cross-sectional area of the silver particles, the Heywood diameters of the silver particles, the Heywood diameters of the pores, and the area were measured. For each of them, 5 fields of view were measured.

The silver powder of Example 1 was found to include a total of 566 pores having Heywood diameters of 10 nm or greater but less than 30 nm in the 5 fields of view. Among them, the number of the pores of 10 nm or greater but less than 20 nm was found to be 418 in total in the 5 fields of view. The number of the pores having Heywood diameters of 10 nm or greater but less than 30 nm relative to the area of the cross sections of the particles was found to be 25 pores/$\mu m^2$ as the average of the 5 fields of view. The porosity (%) expressed as the area of the pores relative to the area of the cross sections of the particles was found to be 2.7% as the average of the 5 fields of view.

The silver powder of Example 1 was spherical, and the Heywood diameters of the cross sections of the silver particles were found to be 0.88 μm as the average of the 5 fields of view.

Example 2

Silver powder of Example 2 was obtained in the same manner as in Example 1 except that 113.9 g of aqueous ammonia having a concentration of 28% by mass (corresponding to 1.95 mole equivalents relative to the silver) was added to the aqueous silver nitrate solution, that the aqueous sodium hydroxide solution was not added, and that the concentration and the amount of the formaldehyde solution were respectively changed to 37.0% and 181.2 g (corresponding to 9.3 mole equivalents relative to the silver).

The temperature of the cooling water was set to 20° C., the liquid temperature of the aqueous silver ammine complex solution before the start of the mixing was 20° C., and the highest reached temperature 90 seconds from the start of the mixing was 27° C.

Figure 3:
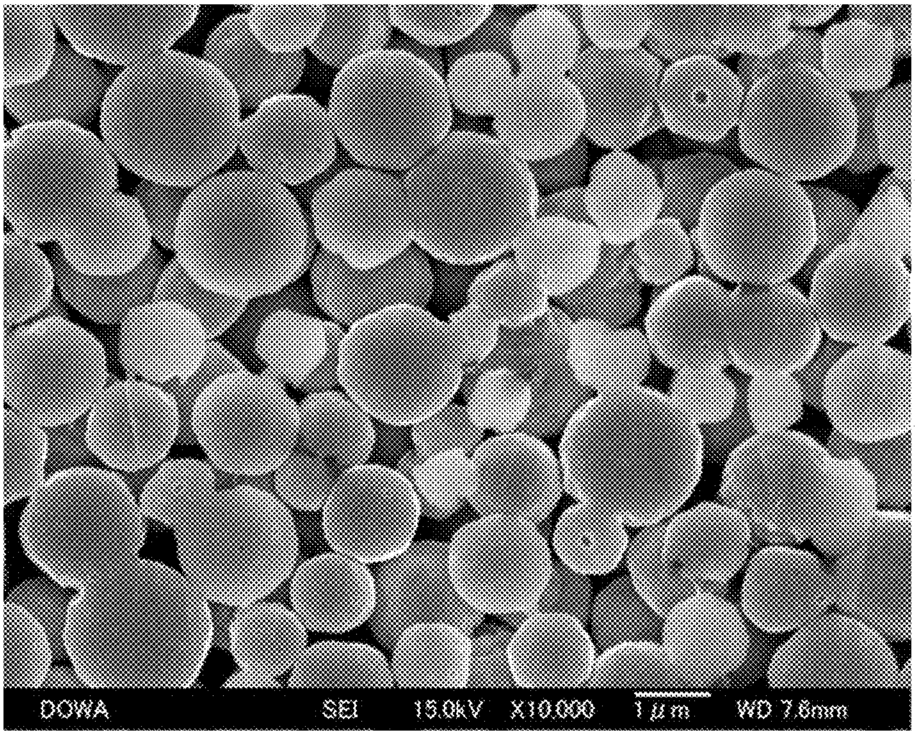
FIG. 3 is a cross-sectional SEM image of silver powder of Example 2 observed at a magnification of 10,000.

FIG. 3 depicts a FE-SEM image of the silver powder of Example 2 observed at a magnification of 10,000. As a result of observing the cross sections of the particles at a magnification of 10,000 (the total area of the cross sections of the particles: 74 $\mu m^2$), the pores having Heywood diameters of 200 nm or greater were not observed. Although one more field of view was observed in addition to FIG. 3, the pores having Heywood diameters of 200 nm or greater were not observed.

Figure 4:
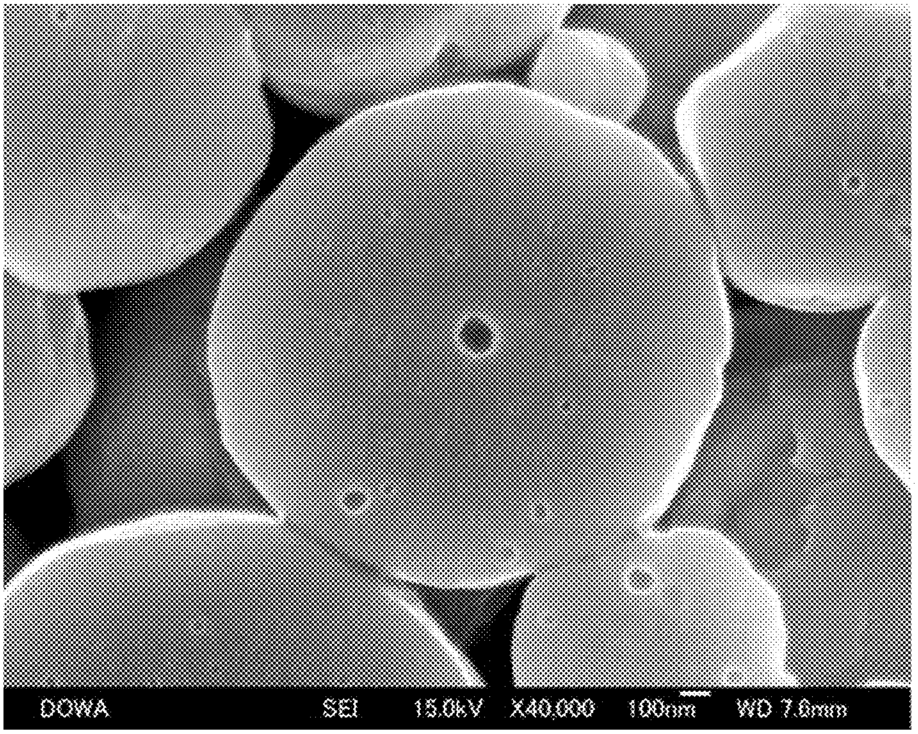
FIG. 4 is a cross-sectional SEM image of silver powder of Example 2 observed at a magnification of 40,000.

FIG. 4 depicts one field of view of the images obtained by photographing the cross sections of the particles in 5 fields of view at a magnification of 40,000. The silver powder of Example 2 was found to include a total of 622 pores having Heywood diameters of 10 nm or greater but less than 30 nm in the 5 fields of view at a magnification of 40,000. Among them, the number of the pores of 10 nm or greater but less than 20 nm was found to be 417 in total in the 5 fields of view. The number of the pores having Heywood diameters of 10 nm or greater but less than 30 nm relative to the area of the cross sections of the particles was found to be 28 pores/$\mu m^2$ as the average of the 5 fields of view. The porosity (%) expressed as the area of the pores relative to the area of the cross sections of the particles was found to be 2.0% as the average of the 5 fields of view.

The silver powder of Example 2 was spherical, and the Heywood diameters of the cross sections of the silver particles were found to be 0.76 μm as the average of the 5 fields of view.

Comparative Example 1

Silver powder of Comparative Example 1 was obtained in the same manner as in Example 1 except that the cooling jacket was not provided and the aqueous silver nitrate solution of 26.5° C. without cooling was used. The liquid temperature of the aqueous silver ammine complex solution before the start of the mixing was 28° C. and the highest reached temperature 90 seconds from the start of the mixing was 37° C.

Figure 5:
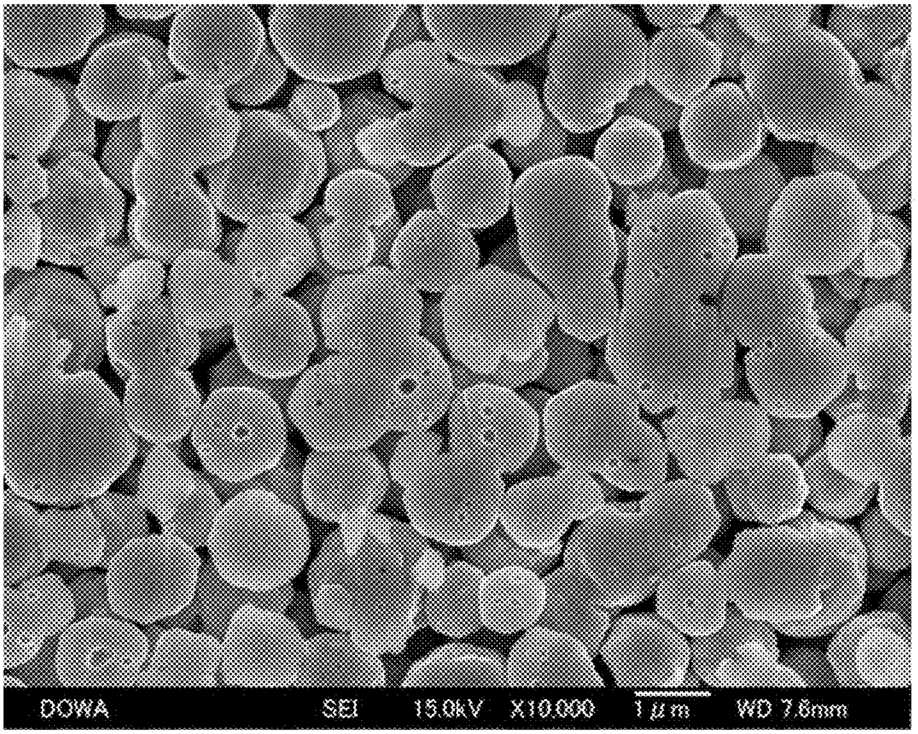
FIG. 5 is a cross-sectional SEM image of silver powder of Comparative Example 1 observed at a magnification of 10,000.

FIG. 5 depicts a FE-SEM image of the silver powder of Comparative Example 1 observed at a magnification of 10,000. As a result of observing the cross sections of the particles in the silver powder of Comparative Example 1 at a magnification of 10,000 (the total area of the cross sections of the particles: 70 $\mu m^2$), the pores having Heywood diameters of 200 nm or greater were observed. The number thereof was found to be 2. One more field of view was observed in addition to FIG. 5, and the density of the pores (pores/$\mu m^2$) having Heywood diameters of 200 nm or greater relative to the area of the cross sections of the particles in the 2 fields of view was found to be 0.05.

Figure 6:
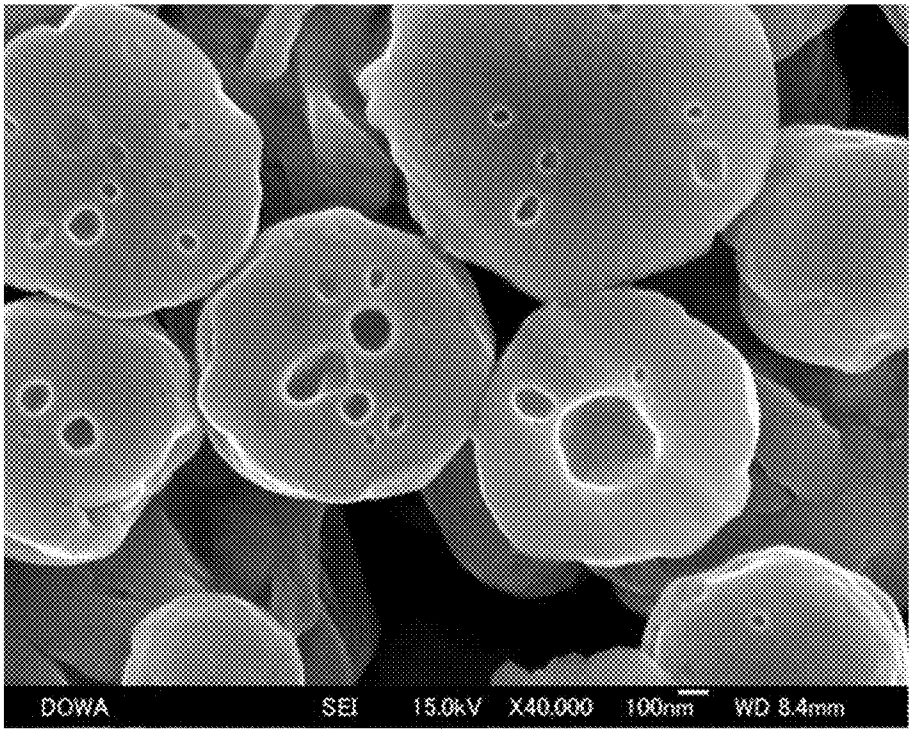
FIG. 6 is a cross-sectional SEM image of silver powder of Comparative Example 1 observed at a magnification of 40,000.

FIG. 6 depicts one field of view of the images obtained by photographing the cross sections of the particles in 5 fields of view at a magnification of 40,000. The silver powder of Comparative Example 1 was found to include a total of 329 pores having Heywood diameters of 10 nm or greater but less than 30 nm in the 5 fields of view at a magnification of 40,000. Among them, the number of the pores of 10 nm or greater but less than 20 nm was found to be 192 in total in the 5 fields of view. The number of the pores having Heywood diameters of 10 nm or greater but less than 30 nm relative to the area of the cross sections of the particles was found to be 16 pores/$\mu m^2$ as the average of the 5 fields of view. The porosity (%) expressed as the area of the pores relative to the area of the cross sections of the particles was found to be 3.9% as the average of the 5 fields of view.

The silver powder of Comparative Example 1 was spherical, and the Heywood diameters of the cross sections of the silver particles were found to be 0.82 μm as the average of the 5 fields of view.

Comparative Example 2

Silver powder of Comparative Example 2 was obtained in the same manner as in Example 2 except that the cooling jacket was not provided and the aqueous silver nitrate solution of 26.5° C. without cooling was used. The liquid temperature of the aqueous silver ammine complex solution before the start of the mixing was 28° C. and the highest reached temperature 90 seconds from the start of the mixing was 35.0° C.

Figure 7:
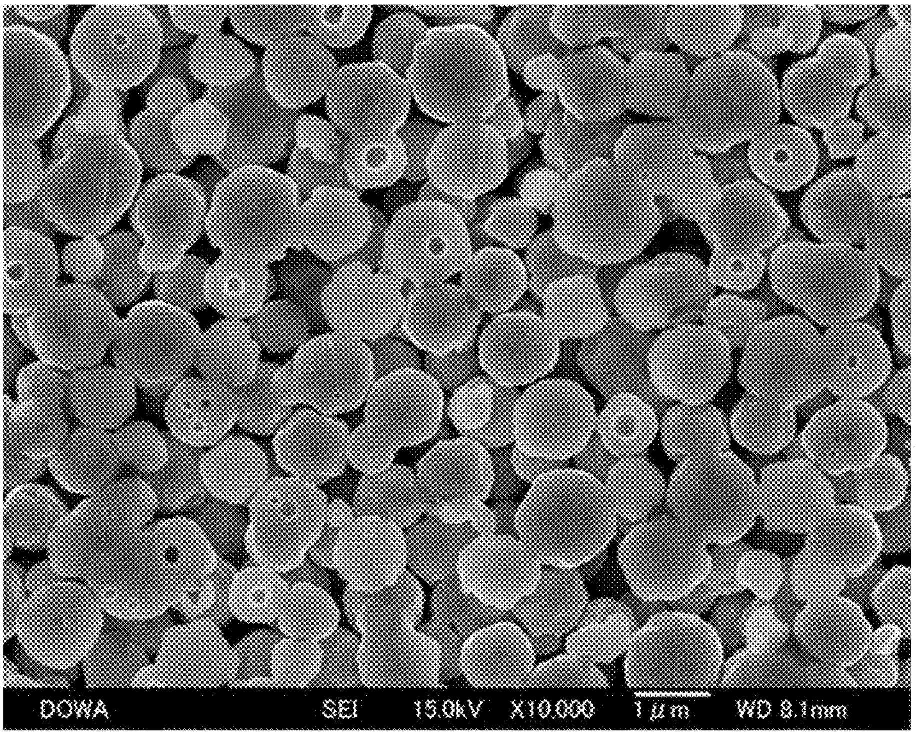
FIG. 7 is a cross-sectional SEM image of silver powder of Comparative Example 2 observed at a magnification of 10,000.

FIG. 7 depicts a FE-SEM image of the silver powder of Comparative Example 2 observed at a magnification of 10,000. As a result of observing the cross sections of the particles at a magnification of 10,000 (the total area of the cross sections of the particles: 133 $\mu m^2$), the pores having Heywood diameters of 200 nm or greater were observed. The number thereof was found to be 10. One more field of view was observed in addition to FIG. 7, and the density of the pores (pores/$\mu m^2$) having Heywood diameters of 200 nm or greater relative to the area of the cross sections of the particles in the 2 fields of view was found to be 0.07.

Figure 8:
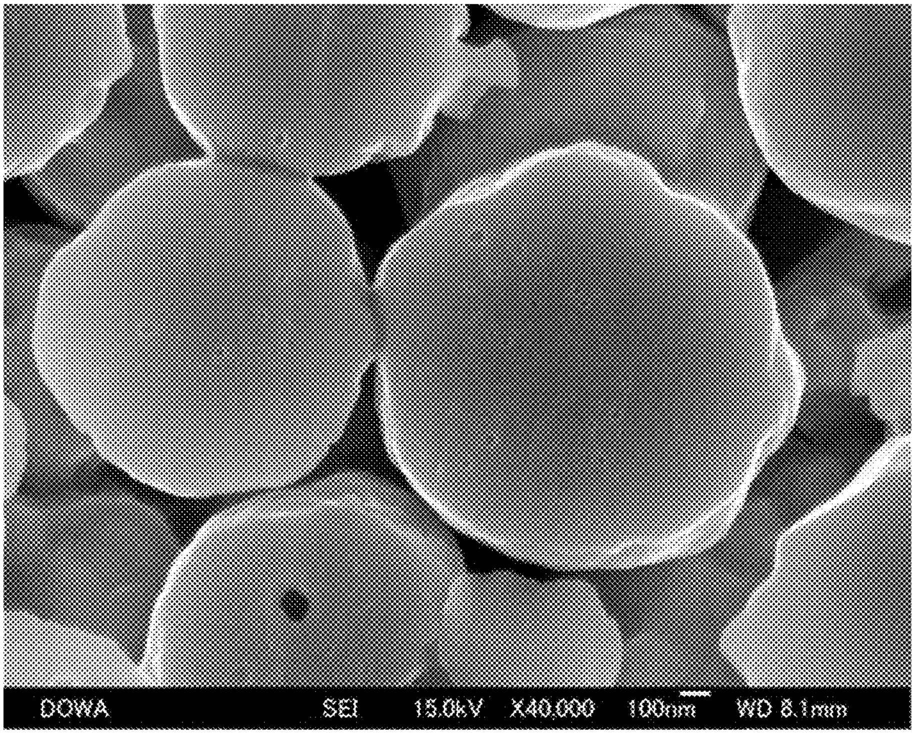
FIG. 8 is a cross-sectional SEM image of silver powder of Comparative Example 2 observed at a magnification of 40,000.

FIG. 8 depicts one field of view of the images obtained by photographing the cross sections of the particles in 5 fields of view at a magnification of 40,000. The silver powder of Comparative Example 2 was found to include a total of 517 pores having Heywood diameters of 10 nm or greater but less than 30 nm in the 5 fields of view at a magnification of 40,000. Among them, the number of the pores of 10 nm or greater but less than 20 nm was found to be 443 in total in the 5 fields of view. The number of the pores having Heywood diameters of 10 nm or greater but less than 30 nm relative to the area of the cross sections of the particles was found to be pores/$\mu m^2$ as the average of the 5 fields of view. The porosity (%) expressed as the area of the pores relative to the area of the cross sections of the particles was found to be 1.23% as the average of the 5 fields of view.

The silver powder of Comparative Example 2 was spherical, and the Heywood diameters of the cross sections of the silver particles were found to be 0.69 μm as the average of the 5 fields of view.

Table 1 summarizes the numbers of the pores having Heywood diameters in the respective ranges in the 2 fields of view at a magnification of 10,000, the area of the cross sections of the particles, and the porosity in the Examples and the Comparative Examples. The number of the pores having Heywood diameters of 200 nm or greater per 1 $\mu m^2$ of the cross sections (the average in the 2 fields of view) was found to be 0.05 pores/$\mu m^2$ in Comparative Example 1 and 0.07 pores/$\mu m^2$ in Comparative Example 2, and to be zero in Example 1 and Example 2.

Note in each example that, the field of view (1) corresponds to the SEM image photograph (FIG. 1, 3, 5, or 7).

TABLE 1

| | | Ex. 1 | | Ex. 2 | | Comp. Ex. 1 | | Comp. Ex. 2 | |
|---|---|---|---|---|---|---|---|---|---|
| | | Field of view (1) | Field of view (2) | Field of view (1) | Field of view (2) | Field of view (1) | Field of view (2) | Field of view (1) | Field of view (2)) |
| Number of pores | Heywood diameters of the pores 300 nm or greater | 0 | 0 | 0 | 0 | 0 | 2 | 0 | 2 |
| | 200 nm or greater less than 300 nm | 0 | 0 | 0 | 0 | 2 | 3 | 10 | 7 |
| | 100 nm or greater less than 200 nm | 24 | 20 | 6 | 1 | 27 | 35 | 14 | 18 |
| | 50 nm or greater less than 100 nm | 153 | 194 | 97 | 100 | 177 | 167 | 63 | 53 |
| | 10 nm or greater less than 50 nm | 395 | 504 | 286 | 262 | 206 | 174 | 142 | 177 |
| Area of cross sections of silver particles ($\mu m^2$) | | 62 | 68 | 74 | 67 | 70 | 64 | 133 | 137 |
| Average of the numbers of the pores having Heywood diameters of 200 nm or greater relative to the cross-sectional area of the particles (pores/$\mu m^2$) | | 0.00 | | 0.00 | | 0.05 | | 0.07 | |
| Porosity (%) | | 1.18 | 1.92 | 0.88 | 0.87 | 1.89 | 2.51 | 0.80 | 0.77 |

Table 2-1 and Table 2-2 each summarize the numbers of the pores having Heywood diameters in the respective ranges in the 5 fields of view at a magnification of 40,000, the area of the cross sections of the particles, and the porosity in the Examples and the Comparative Examples.

TABLE 2-1

| | | Example 1 | | | | | Example 2 | | | | |
|---|---|---|---|---|---|---|---|---|---|---|---|
| | | Field of view (1) | Field of view (2) | Field of view (3) | Field of view (4) | Field of view (5) | Field of view (1) | Field of view (2) | Field of view (3) | Field of view (4) | Field of view (5) |
| Number of pores | Heywood diameters of the pores 500 nm or greater | 0 | 0 | 0 | 0 | 0 | 0 | 0 | 0 | 0 | 0 |
| | 200 nm or greater less than 500 nm | 0 | 0 | 0 | 0 | 0 | 0 | 0 | 0 | 0 | 0 |
| | 100 nm or greater less than 200 nm | 4 | 3 | 1 | 2 | 1 | 1 | 0 | 1 | 0 | 1 |
| | 50 nm or greater less than 100 nm | 12 | 7 | 12 | 14 | 12 | 8 | 7 | 6 | 6 | 3 |
| | 40 nm or greater less than 50 nm | 9 | 13 | 4 | 12 | 10 | 6 | 13 | 7 | 5 | 6 |
| | 30 nm or greater less than 40 nm | 14 | 9 | 3 | 11 | 14 | 16 | 23 | 6 | 16 | 16 |
| | 20 nm or greater less than 30 nm | 51 | 29 | 12 | 26 | 30 | 52 | 58 | 21 | 35 | 39 |
| | 10 nm or greater less than 20 nm | 131 | 75 | 32 | 78 | 102 | 132 | 69 | 58 | 51 | 107 |
| Area of cross sections of silver particles ($\mu m^2$) | | 5.59 | 4.15 | 3.00 | 4.47 | 4.87 | 4.39 | 4.89 | 3.52 | 4.59 | 4.67 |
| Heywood diameters of silver particles ($\mu m$) | | | | 0.88 | | | | | 0.76 | | |

TABLE 2-1-continued

| | | Example 1 | | | | | Example 2 | | | | |
|---|---|---|---|---|---|---|---|---|---|---|---|
| | | Field of view (1) | Field of view (2) | Field of view (3) | Field of view (4) | Field of view (5) | Field of view (1) | Field of view (2) | Field of view (3) | Field of view (4) | Field of view (5) |
| Average of the numbers of the pores having Heywood diameters of 10 nm or greater but less than 30 nm relative to the cross-sectional area of the particles (pores/μm$^2$) | | | | 25.2 | | | | | 28.1 | | |
| Porosity (%) | | 3.03 | 2.73 | 2.46 | 2.90 | 2.59 | 2.51 | 2.28 | 2.22 | 1.47 | 1.71 |
| Average of porosity (%) | | | | 2.7 | | | | | 2.0 | | |

TABLE 2-2

| | | Comparative Example 1 | | | | | Comparative Example 2 | | | | |
|---|---|---|---|---|---|---|---|---|---|---|---|
| | | Field of view (1) | Field of view (2) | Field of view (3) | Field of view (4) | Field of view (5) | Field of view (1) | Field of view (2) | Field of view (3) | Field of view (4) | Field of view (5) |
| Number of pores | Heywood diameters of the pores 500 nm or greater | 0 | 0 | 0 | 0 | 0 | 0 | 0 | 0 | 0 | 0 |
| | 200 nm or greater less than 500 nm | 1 | 1 | 0 | 0 | 0 | 0 | 0 | 1 | 0 | 0 |
| | 100 nm or greater less than 200 nm | 8 | 2 | 0 | 2 | 4 | 0 | 1 | 1 | 0 | 0 |
| | 50 nm or greater less than 100 nm | 16 | 13 | 6 | 11 | 10 | 3 | 0 | 2 | 4 | 6 |
| | 40 nm or greater less than 50 nm | 3 | 9 | 8 | 6 | 8 | 0 | 1 | 1 | 2 | 0 |
| | 30 nm or greater less than 40 nm | 3 | 23 | 14 | 24 | 8 | 4 | 6 | 6 | 2 | 3 |
| | 20 nm or greater less than 30 nm | 23 | 33 | 20 | 39 | 22 | 18 | 14 | 15 | 14 | 13 |
| | 10 nm or greater less than 20 nm | 45 | 41 | 38 | 40 | 28 | 104 | 99 | 95 | 82 | 63 |
| Area of cross sections of silver particles (μm$^2$) | | 3.42 | 5.02 | 3.76 | 4.39 | 4.16 | 4.80 | 3.83 | 3.84 | 3.95 | 4.44 |
| Heywood diameters of silver particles (μm) | | | | 0.82 | | | | | 0.69 | | |
| Average of the numbers of the pores having Heywood diameters of 10 nm or greater but less than 30 nm relative to the cross-sectional area of the particles (pores/μm$^2$) | | | | 16.0 | | | | | 25.0 | | |
| Porosity (%) | | 8.00 | 3.98 | 1.65 | 2.58 | 3.08 | 0.93 | 1.02 | 2.27 | 1.01 | 0.93 |
| Average of porosity (%) | | | | 3.9 | | | | | 1.23 | | |

Production conditions in these Examples and Comparative Examples and measurement results of the following powder properties of the obtained silver powder are presented in Table 3-1 and Table 3-2.

<Measurement of Specific Surface Area>

A BET specific surface area meter (4 SORB US, obtained from Yuasa Ionics Co., Ltd.) was used to measure the specific surface area by the single point BET method.

<Measurement of Particle Size Distribution>

Cumulative 10% of particle diameter (D10), cumulative 50% of particle diameter (D50), and cumulative 90% of particle diameter (D90) on the volume basis and peak top frequency were measured by the following method.

Specifically, 0.1 g of the silver powder was added to 40 mL of isopropyl alcohol (IPA) and dispersed for 2 minutes with an ultrasonic homogenizer (device name: US-150T, obtained from NISSEI Corporation; 19.5 kHz, tip end diameter: 18 mm). After that, the mixture was measured with a laser diffraction/scattering particle size distribution analyzer (MICROTRAC MT-3300 EXII, obtained from Microtrac-BEL Corp.).

The peak top frequency refers to a value of frequency when the frequency (%) is the highest in a distribution of particle diameters where the vertical axis is the frequency.

<Weight Loss End Temperature>

The weight loss end temperature was measured through thermogravimetry-differential thermal analysis (TG-DTA) (thermogravimetry-differential thermal analyzer TG8120, obtained from Rigaku Corporation) from room temperature to 400° C. at a heating rate of 10° C./min under the atmosphere. The weight loss end temperature was defined as a temperature at which the weight change (vertical axis) decreased to 90% of the maximum weight loss (the maximum lost weight) until the temperature reached 400° C.

TABLE 3-1

| | Reaction start temp. (° C.) | Highest reached temp. (° C.) | Number of the pores having Heywood diameters of 200 nm or greater relative to the area of the cross sections of the particles (pores/μm$^2$) | Number of the pores having Heywood diameters of 10 nm or greater but less than 30 nm relative to the area of the cross sections of the particles (pores/μm$^2$) | Weight loss end temp. (° C.) |
|---|---|---|---|---|---|
| Ex. 1 | 20 | 30.0 | 0.00 | 25.2 | 265 |
| Ex. 2 | 20 | 27.3 | 0.00 | 28.1 | 250 |
| Comp. Ex. 1 | 28 | 36.7 | 0.05 | 16.0 | 331 |
| Comp. Ex. 2 | 28 | 35.0 | 0.07 | 25.0 | 269 |

TABLE 3-2

| | Specific surface area (m$^2$/g) | Particle size distribution D10 (μm) | Particle size distribution D50 (μm) | Particle size distribution D90 (μm) | Particle size distribution Peak top frequency (%) |
|---|---|---|---|---|---|
| Ex. 1 | 0.37 | 1.42 | 2.15 | 3.84 | 10.72 |
| Ex. 2 | 0.40 | 1.30 | 2.10 | 3.34 | 9.84 |
| Comp. Ex. 1 | 0.41 | 1.27 | 2.06 | 3.28 | 9.91 |
| Comp. Ex. 2 | 0.49 | 1.12 | 1.90 | 3.12 | 9.14 |

From the results of the thermogravimetry-differential thermal analysis, the weight loss end temperature was 331° C. in Comparative Example 1, 269° C. in Comparative Example 2, 265° C. in Example 1, and 250° C. in Example 2, indicating that the weight loss end temperatures of Examples 1 and 2 were lower. It is thus expected that the components contained in the pores tend to be released more rapidly in Examples 1 and 2 than in the Comparative Examples.

Production Example of Conductive Paste

Example 1-1

The following components were mixed for 30 seconds with a propeller-free rotation and revolution stirring and defoaming apparatus (AR-250, obtained from THINKY CORPORATION) and this operation was repeated twice. After that, a three roll mill (EXAKT80S, obtained from EXAKT, Co.) was used to knead the mixture. The resultant mixture was allowed to pass through a 500 μm mesh, to obtain a conductive paste of Example 3.

Silver powder of Example 1: 25.5 g

Terpineol (TPO), obtained from FUJIFILM Wako Pure Chemical Corporation: 1.37 g 100 cos 11.5% in TPO, obtained from FUJIFILM Wako Pure Chemical Corporation: 3.13 g The thus-obtained conductive paste was printed in line with a screen printing machine (MT-320T, obtained from Micro-tec Co., Ltd.) on a surface of a 2.5 cm×2.5 cm single crystal silicon substrate (100Ω/□) for a solar cell. The conductive paste was dried with a hot-air dryer at 200° C. for 10 minutes. In a high-speed firing IR furnace (a furnace having four high-speed firing test chambers, obtained from NGK INSULATORS, LTD.), firing was performed in the air with the peak temperature 770° C. and in-out 21 seconds, to form electrode wirings. The obtained conductive film was measured for electrical resistance with a digital multimeter and also was measured for the width, thickness, and length of the line after firing using a microscope to calculate volume resistance (Ω·cm). Results are presented in Table 4.

Example 2-1

A conductive paste of Example 2-1 was obtained in the same manner as in Example 1-1 except that the silver powder of Example 1 was changed to the silver powder of Example 2. Results are presented in Table 4.

Comparative Examples 1-1 and 2-1

Conductive pastes of Comparative Examples 1-1 and 2-1 were obtained in the same manner as in Example 1-1 except that the silver powder of Example 1 was changed to the silver powder of Comparative Example 1 and the silver powder of Comparative Example 2. Results are presented in Table 4.

TABLE 4

| | Width (μm) | Thickness (μm) | Length (cm) | Volume resistance (Ω · cm) |
|---|---|---|---|---|
| Ex. 1-1 | 250 | 9.6 | 5.5 | $2.2 \times 10^{-6}$ |
| Ex. 2-1 | 250 | 11.1 | 5.5 | $2.6 \times 10^{-6}$ |
| Comp. Ex. 1-1 | 250 | 14.5 | 5.5 | $3.4 \times 10^{-6}$ |
| Comp. Ex. 2-1 | 250 | 11.3 | 5.5 | $2.7 \times 10^{-6}$ |

From these Examples and Comparative Examples, it is found that the silver powder of the present invention can draw fine wirings and form electrode wirings having lower resistance after firing than in the existing cases.

Based on the above, the silver powder prepared by the present invention can draw fine wirings and form electrode wirings having lower resistance after firing than in the existing cases. Because firing can be performed at low temperatures and a paste having a low resistance can be prepared, the paste can be used for electrode wirings to various objects and also is expected to improve performances of, for example, a solar cell.

The invention claimed is:

1. A method for producing silver powder including silver particles having closed pores inside the particles, the method comprising adding a reducing agent-containing solution containing aldehyde as a reducing agent to an aqueous reaction system containing silver ions and mixing the aqueous reaction system, wherein a liquid temperature of the aqueous reaction system is maintained to be 33° C. or lower until 90 seconds from start of the mixing.

2. The method producing silver powder according to claim 1, wherein the liquid temperature of the aqueous reaction system is maintained to be 30° C. or lower until 90 seconds from the start of the mixing.

3. The method producing silver powder according to claim 1, wherein the liquid temperature of the aqueous reaction system before addition of the reducing agent is from 10° C. to 20° C., and an amount of the reducing agent added is from 6.0 equivalents to 14.5 equivalents relative to an amount of silver.

* * * * *